(12) United States Patent
Lee et al.

(10) Patent No.: US 9,734,271 B2
(45) Date of Patent: Aug. 15, 2017

(54) METHOD OF DETERMINING GALVANIC CORROSION AND INTERCONNECT STRUCTURE IN A SEMICONDUCTOR DEVICE FOR PREVENTION OF GALVANIC CORROSION

(71) Applicant: TAIWAN SEMICONDUCTOR MANUFACTURING COMPANY LTD., Hsinchu (TW)

(72) Inventors: Yu Ching Lee, Kaohsiung (TW); Jian-Hong Lin, Yunlin (TW); Te-Liang Lee, Hsinchu (TW); Jyh-Weei Hsia, Hsinchu County (TW)

(73) Assignee: TAIWAN SEMICONDUCTOR MANUFACTURING COMPANY LTD., Hsinchu (TW)

(*) Notice: Subject to any disclaimer, the term of this patent is extended or adjusted under 35 U.S.C. 154(b) by 0 days.

(21) Appl. No.: 14/965,661

(22) Filed: Dec. 10, 2015

(65) Prior Publication Data

US 2017/0169152 A1    Jun. 15, 2017

(51) Int. Cl.
| | | |
|---|---|---|
| *H01L 27/10* | (2006.01) | |
| *H01L 29/73* | (2006.01) | |
| *G06F 17/50* | (2006.01) | |
| *H01L 27/06* | (2006.01) | |
| *H01L 23/535* | (2006.01) | |
| *H01L 29/861* | (2006.01) | |
| *H01L 29/423* | (2006.01) | |

(52) U.S. Cl.
CPC ...... *G06F 17/5045* (2013.01); *G06F 17/5081* (2013.01); *H01L 23/535* (2013.01); *H01L 27/0629* (2013.01); *H01L 29/42364* (2013.01); *H01L 29/861* (2013.01)

(58) Field of Classification Search
CPC ............. G06F 17/5045; G06F 17/5081; H01L 27/0629; H01L 23/535; H01L 29/861; H01L 29/42364; H01L 27/0886; H01L 21/823431; H01L 21/823475; H01L 27/0808; H01L 21/0808; H01L 21/30604; H03L 7/099; H03L 7/0891; H03L 7/0995; H03L 7/089; H03B 5/1275; H03B 5/1243; H03B 5/1215; H03B 5/1228
USPC ......................................................... 257/360
See application file for complete search history.

(56) References Cited

U.S. PATENT DOCUMENTS

| | | | | |
|---|---|---|---|---|
| 2005/0118803 | A1* | 6/2005 | Hichri | ................... H01L 23/562 |
| | | | | 438/672 |
| 2006/0043491 | A1* | 3/2006 | Lee | ..................... H01L 27/0255 |
| | | | | 257/355 |

(Continued)

*Primary Examiner* — Evan Pert
*Assistant Examiner* — Changhyun Yi
(74) *Attorney, Agent, or Firm* — WPAT, P.C., Intellectual Property Attorneys; Anthony King

(57) ABSTRACT

In some embodiments, in a method for a semiconductor device having an interconnect structure, a design layout is received. A metal line in the design layout is identified, which has at least one via thereon and does not couple downward with an oxide diffusion region. The area of a gate oxide coupled with the metal line is obtained from the design layout. The method comprises determining whether the area of the gate oxide is greater than a first predetermined value. When the area of the gate oxide is greater than the first predetermined value, a charge release path is coupled with the metal line.

20 Claims, 12 Drawing Sheets

(56) References Cited

U.S. PATENT DOCUMENTS

| | | | |
|---|---|---|---|
| 2006/0097330 A1* | 5/2006 | Yu | H01L 21/76816 257/401 |
| 2007/0080404 A1* | 4/2007 | Fukuro | H01L 27/0251 257/360 |
| 2013/0256801 A1* | 10/2013 | Yen | H01L 21/82387 257/357 |

* cited by examiner

METHOD OF DETERMINING GALVANIC CORROSION AND INTERCONNECT STRUCTURE IN A SEMICONDUCTOR DEVICE FOR PREVENTION OF GALVANIC CORROSION

BACKGROUND

In some manufacturing processes, a wet cleaning process may be performed to remove residues from a semiconductor device. Such wet cleaning process typically uses an aqueous HF (Hydrofluoric acid) solution or other proper HF-based solutions. Such chemical solutions may lead to corrosion in some metal lines in the semiconductor device, due to the phenomenon of galvanic corrosion. Galvanic corrosion refers to an electrochemical process in which one metal corrodes preferentially to another when both metals are in electrical contact, in the presence of an electrolyte. Since a metal line acts as an anode and thus is subjected to a forced and unwanted oxidation during electrolytic solution (e.g., HF) treatment, the metal line is liable to corrosion.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
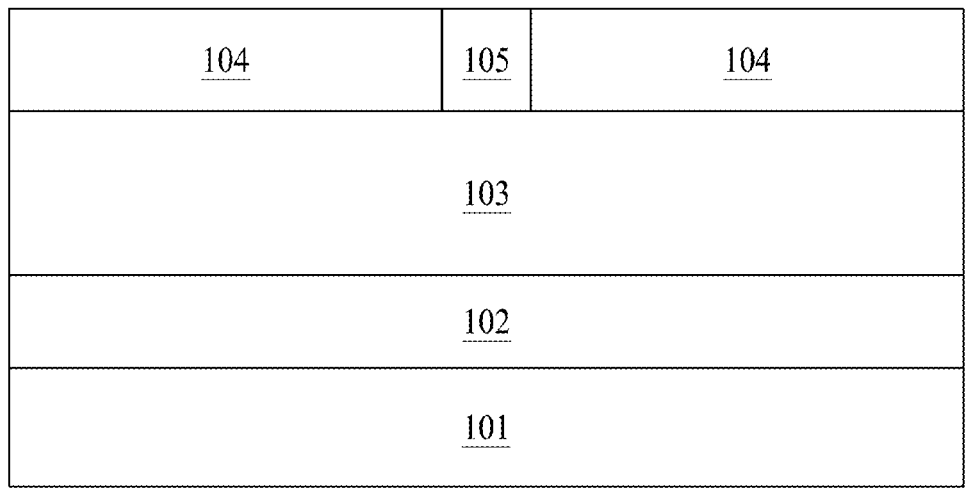
FIGS. 1A-1H are schematic diagrams showing the cause and effect of galvanic corrosion in an exemplary process for forming an interconnect structure in a semiconductor device.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "under," "lower," "above," "over," "onto," "upper", "lower", "left", "right" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. It will be understood that when an element is referred to as being "connected to" or "coupled to" another element, it may be directly connected to or coupled to the other element. Additionally, when an element is referred to as being "connected with" or "coupled with" another element, it may be indirectly connected with or coupled with the other element; for example, any intervening elements may be present.

The present disclosure is related to a method of determining whether galvanic corrosion occurs in a semiconductor device. Moreover, the present disclosure provides a semiconductor device having an interconnect structure for prevention of galvanic corrosion.

FIGS. 1A-1H are schematic diagrams showing the cause and effect of galvanic corrosion in an exemplary process for forming an interconnect structure in a semiconductor device 10. Referring to FIG. 1A, the semiconductor device 10 under fabrication may include a metal line 101, an etch stop layer 102 on the metal line 101, and a dielectric film 103 on the etch stop layer 102. A photoresist layer 104 is deposited on the dielectric film 103. It will be understood that some interconnects (e.g., metal lines and contacts) or elements (e.g., transistors or diodes) may be formed under the metal line 101. For the purpose of simplicity and clarity, these interconnects or elements formed below the metal line 101 are not shown in FIGS. 1A-1H.

In some embodiments, the etch stop layer 102 is a dielectric nitride layer, for example, a silicon nitride layer or an aluminum nitride layer. An exemplary process for depositing a nitride layer is implemented by chemical vapor deposition (CVD). A suitable source gas for the CVD may include silane and ammonia or nitrogen. If an aluminum nitride layer is to be deposited, the layer can be formed by reactive sputtering (RS) with an aluminum target in a nitrogen atmosphere. While dielectric nitride is a desirable material for the etch stop layer 102, the layer's function is to serve as an etch stop for the dielectric film 103.

After the etch stop layer 102 is deposited, the dielectric film 103 is deposited subsequently. The dielectric film 103 may include a silicon dioxide based material, which can be in the form of phosphorus doped silicate glass (PSG), boron-doped PSG (BPSG), tetra-ethyl-ortho-silicate (TEOS), or the like. Moreover, low temperature dielectrics or polyimides may also be suitable for the dielectric film 103. After deposition, the dielectric film 103 may be planarized in, for example, an etch-back process or a chemical mechanical polishing (CMP) operation.

Figure 1B:
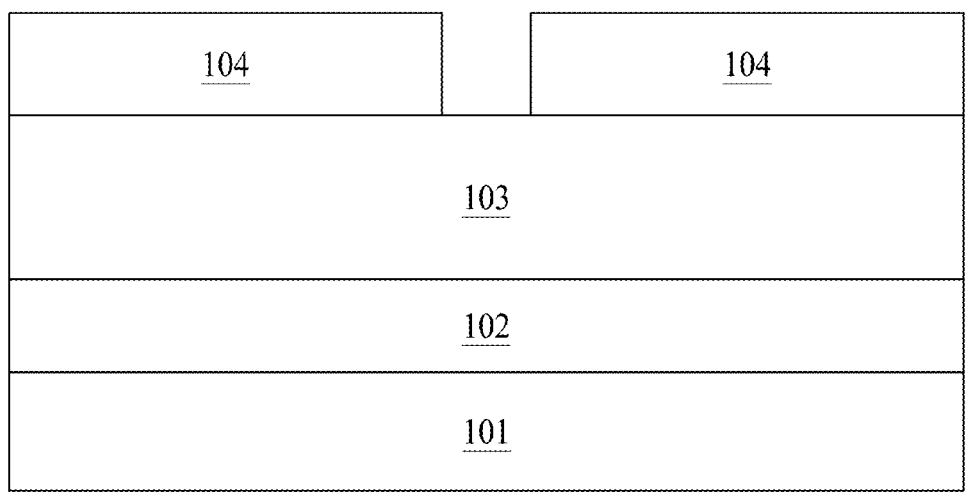

Next, the dielectric film 103 is patterned and etched to form an opening therein. Patterning is accomplished using photolithographic techniques. In operation, the photoresist 104 is deposited on the dielectric film 103 and is selectively exposed to ultraviolet under a patterned mask to form the ultraviolet-exposed photoresist 105 as shown in FIG. 1A. After immersing in a photoresist developer, the ultraviolet-exposed photoresist 105 dissolves in the photoresist developer, exposing a portion of the dielectric film 103, as shown in FIG. 1B. The portions of photoresist 104 which are not exposed to ultraviolet protect the portions of the dielectric film 103 from etching.

Figure 1C:
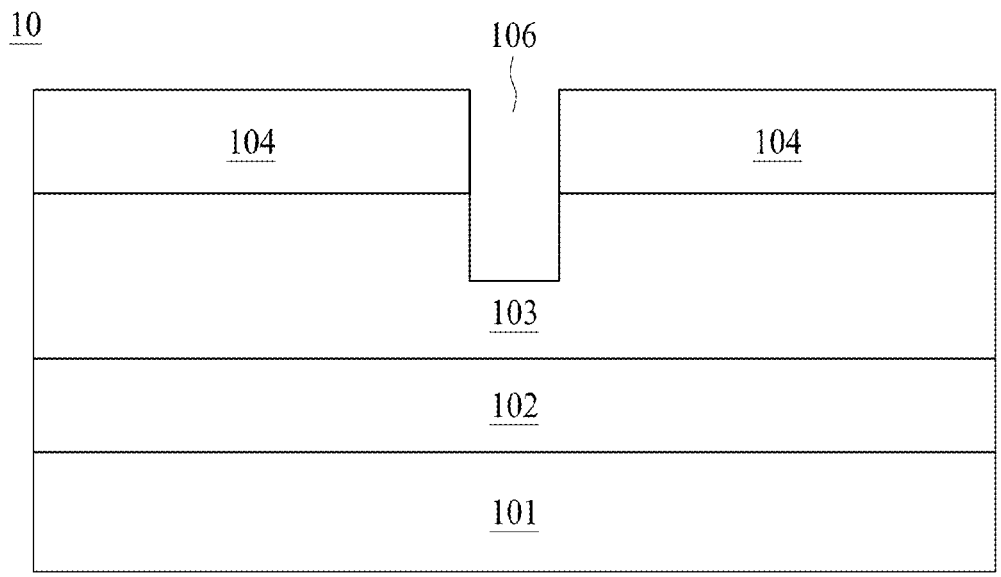
Figure 1D:
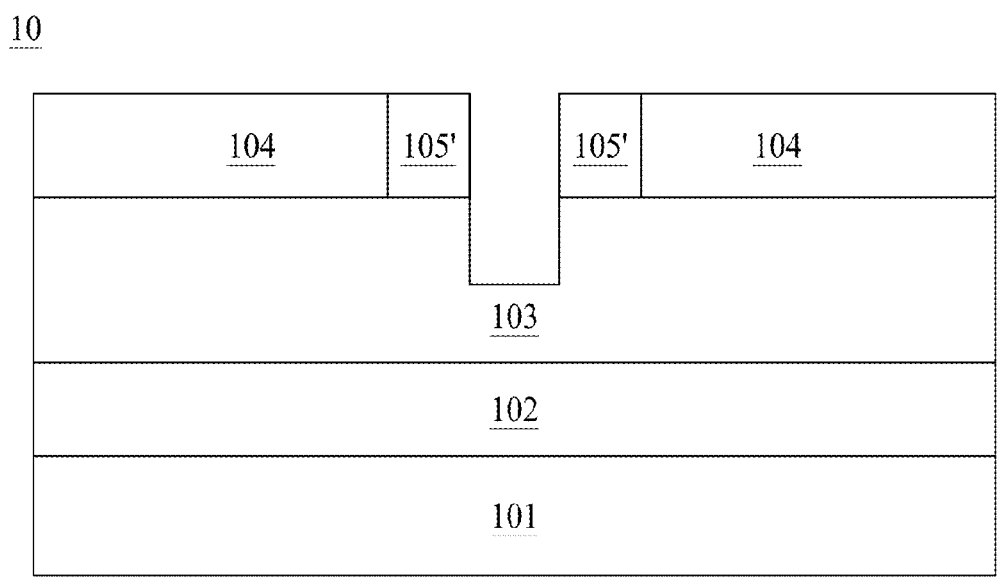
Figure 1E:
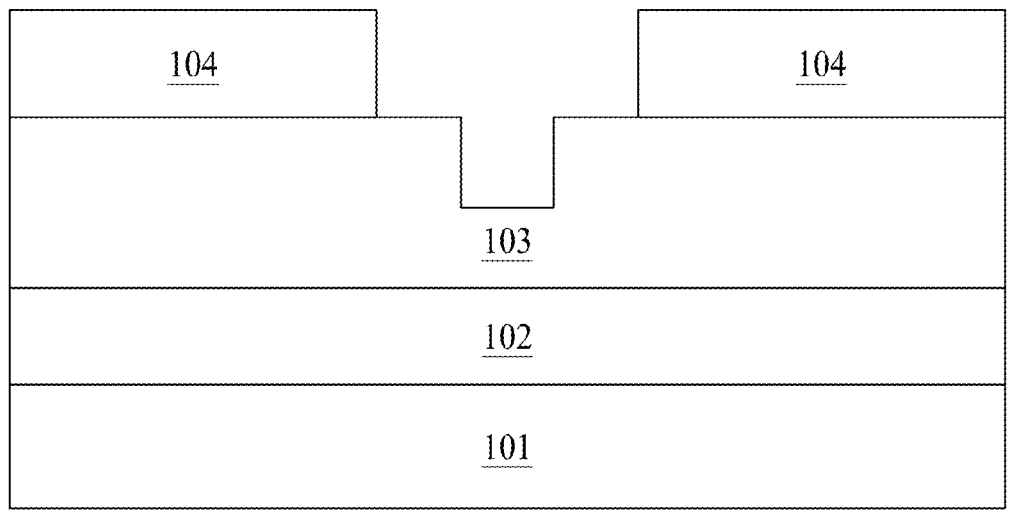
Figure 1F:
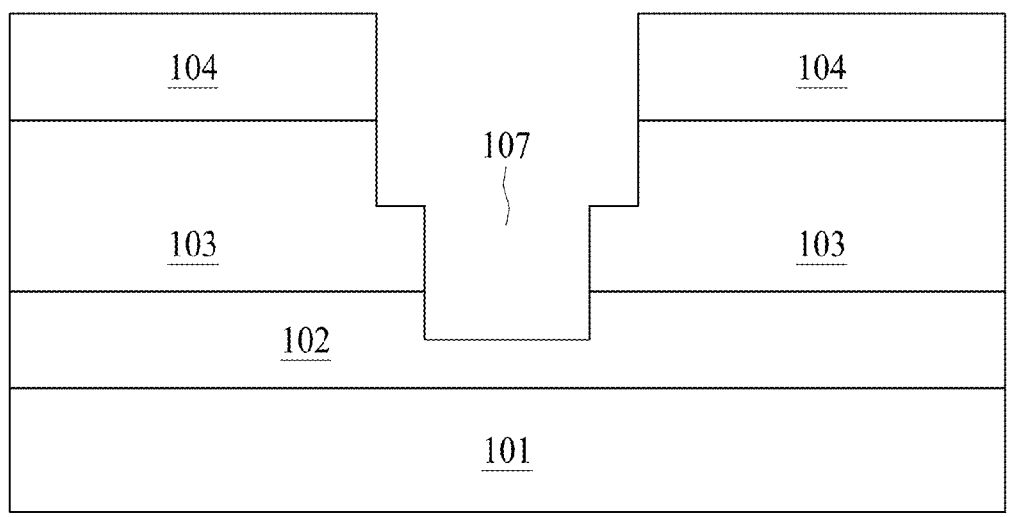

A partially etching process is then performed to remove portions of the dielectric film 103 under an ultraviolet-exposed photoresist 105. Referring to FIG. 1C, a shallow opening 106 is formed in the dielectric film 103. Subsequently, the remaining photoresist 104 on the dielectric film 103 is selectively exposed to ultraviolet under another patterned mask to form the ultraviolet-exposed photoresist 105' as shown in FIG. 1D. After immersing in a photoresist developer again, the ultraviolet-exposed photoresist 105' dissolves in the photoresist developer, resulting in a structure as shown in FIG. 1E. A fully etching process is then performed to remove portions of the dielectric film 103 under an ultraviolet-exposed photoresist 105'. Referring to FIG. 1F, an opening 107 (comprising a trench and a via hole) is formed in the dielectric film 103 and is extended into the etch stop layer 102. The etch stop layer 102 thus protects the metal line 101 from etching.

To form the opening 107 shown in FIG. 1F, a dry etching processing is employed. During the dry etching process, the dielectric film 103 is etched at a speed much faster than the etch stop layer 102, which may include dielectric nitride. If the etch stop layer 102 is a silicon nitride layer, a suitable etch chemistry used to form the opening 107 to extend through the dielectric film 103 to the etch stop layer 102 includes $C_2F_6$ and argon or $C_3F_8$ and argon (either with or without CO). The same etch chemistry can be used to stop the opening 107 in an aluminum nitride etch stop layer. After the dry etching process, the opening 107 is not extended to the metal line 101 yet. However, in some embodiments, the opening 107 extends through the dielectric film 103 and the etch stop layer 102 and thus exposes the metal line 101 by one or more dry etching processes.

Figure 1G:
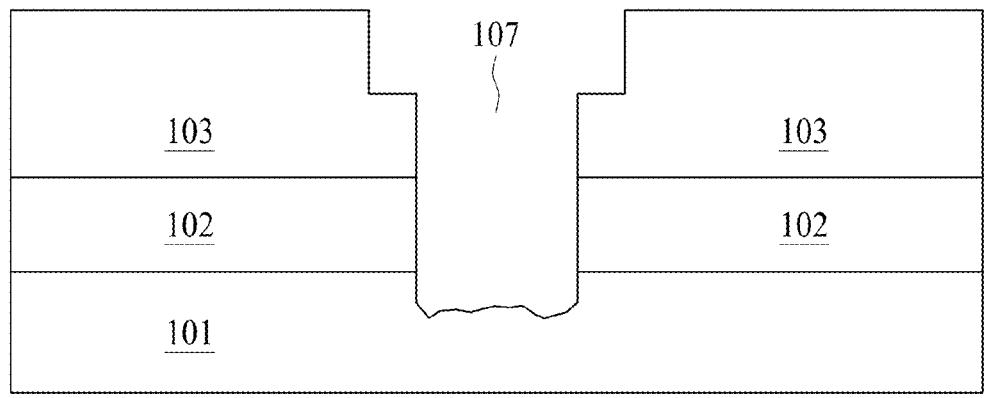

In order to extend the opening to the metal line 101, portions of the etch stop layer 102 within the opening are then removed. After the above-mentioned dry etching process, wet cleaning (e.g., wet etching) solutions such as HF-based solutions are used to remove the residues of the photoresist 104 and etch stop layer 102. If a gate oxide of a Metal-Oxide-Semiconductor (MOS) transistor below the metal line 101 is to be coupled with the metal line 101, and if the cleaning solution used to remove the residues of the photoresist 104 and etch stop layer 102 includes, for example, an HF-based mixture, an under-etching (attack) of the metal line 101 occurs because of the galvanic corrosion effect, as shown in FIG. 1G. Additionally, in some embodiments, if the opening 107 stops in the metal line 101 before the wet etching, the wet cleaning solutions may cause the galvanic corrosion effect on the surface of the metal line 101.

Figure 1H:
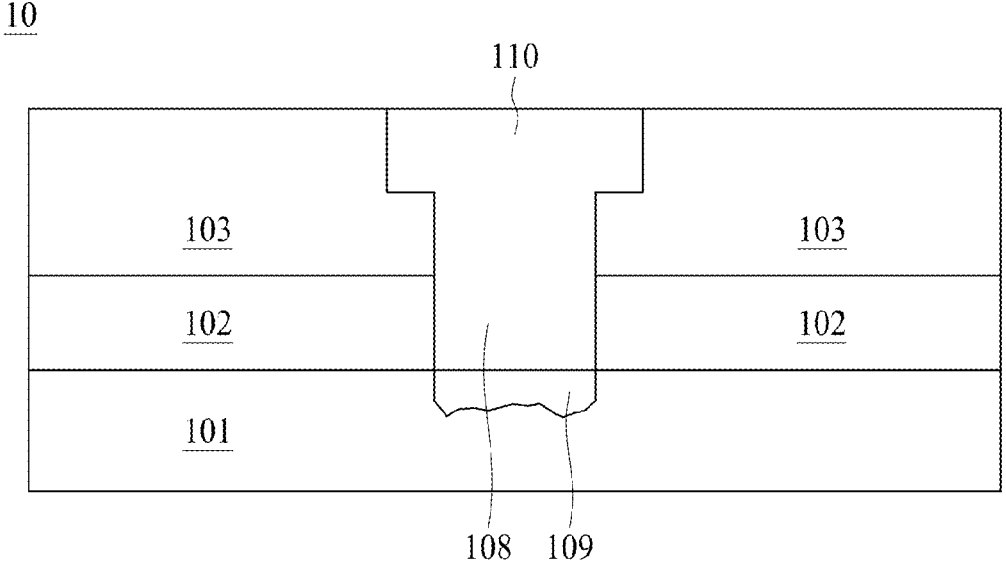

After cleaning the residues of the photoresist 104 and etch stop layer 102, a conductive material is deposited into the opening 107 shown in FIG. 1H to form a conductive via 108 and another metal line 110. Ideally, the via 108 is in contact with the metal line 101 to provide good conductivity. However, due to the galvanic corrosion effect on the metal line 101 during the wet cleaning, void 109 is formed between the via 108 and metal line 101. Said void 109 leads to undesirable conductivity or even destroys the conductivity between the via 108 and metal line 101.

Figure 2:
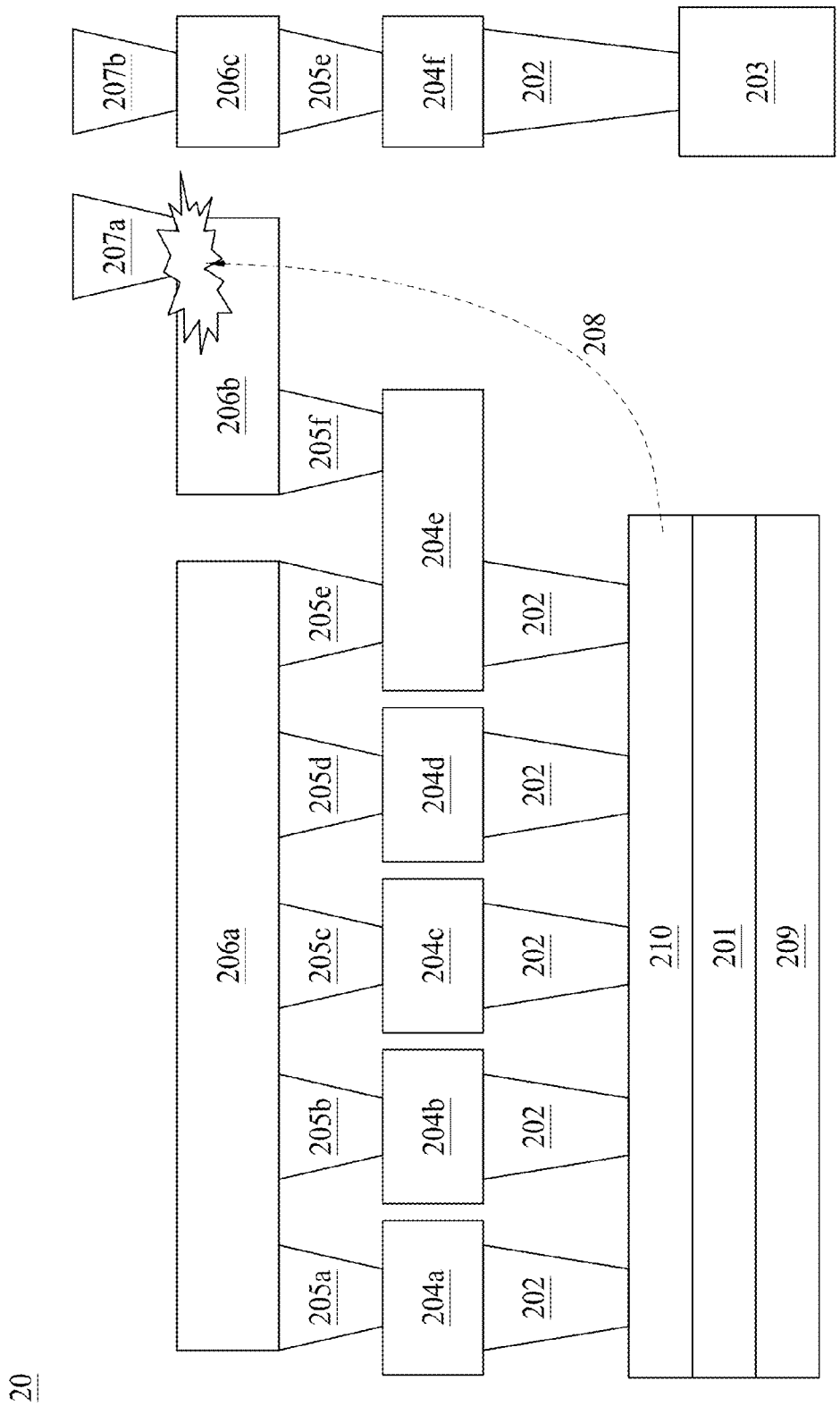
FIG. 2 is a cross-sectional diagram showing galvanic corrosion at an exemplary interconnect structure of a semiconductor device.

FIG. 2 a cross-sectional diagram showing galvanic corrosion at an exemplary interconnect structure of a semiconductor device 20. Referring to FIG. 2, of the semiconductor device 20 includes a gate oxide 201, contacts 202, oxide diffusion (OD) areas (also called oxide definition areas, i.e., active areas) 203 and 209, metal lines 204a-204f and 206a-206c, vias 205a-205g, 207a, and 207b, and a gate 210. Semiconductor devices employing higher device integration density, such as finned field effect transistor (FinFET) semiconductor devices, include a billion transistors on a single semiconductor die in some instances. FinFET NMOS and PMOS transistors are formed in OD areas. The OD area defines an active area for each transistor, i.e., the area where the source, drain and channel under the gate of transistor are formed. The OD is defined to be between inactive areas, such as shallow trench isolation (STI) or field oxide (FOX) areas. An OD area contains PMOS or NMOS transistors. A discontinuity (gap) separates adjacent OD regions. Under certain circumstances, such discontinuities between the OD areas cause device performance degradation. In increasingly deep submicron feature size semiconductor devices, electrical characteristics of such devices are increasingly affected by variations in OD density. For example, compressive forces caused by shallow trench isolation (STI) in inactive areas associated with OD areas degrade NMOS transistor performance. Such performance degradation due to variations in OD density is even more significant if a high gradient in OD density exists on the die of a semiconductor device. While PMOS transistor performance improves under some compressive forces, predictability of PMOS drive current is also negatively affected by variations in OD density, especially in the presence of high gradient in OD density.

For the purpose of simplicity and clarity, the dielectric layers, such as the etch stop layer 102 and dielectric film 103 in FIGS. 1A-1H, are not shown. During the processes of forming the metal lines and vias over the gate oxide 201, since the gate oxide 201 is not electrified yet, the gate oxide 201 would act as a large capacitor, for example, a MOS-type capacitor. Such large capacitor can be found in mixed-signal or radio frequency circuits, decoupling capacitors, or phase-locked loop circuits in a semiconductor device. Moreover, during the processes of forming the metal lines and vias, charges from the gate oxide 201 may be accumulated at the upper layers in an interconnect structure of the semiconductor device 20. For example, if the layer of metal lines 206a-206c is formed subsequent to the formation of the vias 205a-205g, metal lines 204a-204f, oxide diffusion area 203, contacts 202, and gate oxide 201, charges from the gate oxide 201 are accumulated at both metal lines 206a and 206b. Besides, charges would not accumulate at the metal line 206c because metal line 206c is not coupled with the gate oxide 201 yet. Furthermore, according to the basic principles in electricity associated with a capacitor, in a close electrical system, the density of charges in a capacitor is kept unchanged if the amount of charges and the magnitude of electric field are kept unchanged. As a result, the larger area of a conductor in the capacitor is, the more amount of charges the conductor has. In the present embodiment, prior to the formation of vias 207a and 207b, charges in the metal line 206a are more than those in the metal line 206b. A dashed line 208 clearly shows a path of the accumulated charges.

In FIG. 2, galvanic corrosion would not occur between the metal line 206c and via 207b because the oxide diffusion area 203 does not act as a large capacitor for providing charges. For the same reasons, galvanic corrosion would not occur between metal lines and vias in higher levels of the interconnect structure electrically connected to the oxide diffusion area 203.

In addition, galvanic corrosion would not occur between the metal lines 204a-204e and the vias 205a-205f associated with the metal lines 204a-204e. The metal lines 204a-204d have substantially the same areas and thus charges from the gate oxide 201 are uniformly accumulated at metal lines 204a-204d. Since the area of each of the metal lines 204a-204d is relatively small, each of the metal lines 204a-204d accumulates few charges. In that case, even though each of the metal lines 204a-204d has only one via thereon, the concentration of charges accumulated between each of the metal lines 204a-204d and its corresponding via is lower than that between the metal line 206b and via 207a. The concentration of charges accumulated between a metal line and its corresponding via may be determined by a ratio of the area of the metal line to the number of via on the metal line. As a result, galvanic corrosion would be likely to occur when the number of via is relatively few or the area of metal line is relatively large, or both. As an example of the metal line 204e, although the metal line 204e is for example substantially twice as large as any one of the metal line 204a-204d, the concentrations of charges between the metal line 204e and any one of vias 205e and 205f is substantially identical to that between any one of the metal lines 204a-204d and the corresponding via because the metal line 204e has two vias thereon. Due to a relatively low concentration of charges, galvanic corrosion would not occur between any one of the metal lines 204a-204e and the corresponding via(s).

Additionally, galvanic corrosion would not occur between the metal lines 206a and 206b and the vias 205a-205f. The metal lines 206a and 206b and vias 205a-205f are shown as separate structures in FIG. 2, but they are deposited in one operation, so no wet cleaning operation is performed at the interfaces between the metal lines 206a and 206b and vias 205a-205f. Since no wet cleaning operation is performed, galvanic corrosion would not occur at the interfaces between the metal lines 206a and 206b and vias 205a-205f. As a result, the concentrations of charges at the interfaces between the vias 205a-205e and metal line 206a and between the via 205f and metal line 206b are relatively low and no the galvanic corrosion may be likely to occur. In view of the above, it can be derived that a galvanic corrosion occurs because of three factors: a charge tank (e.g., the gate oxide 201), accumulation of charges (due to metal lines whose area is much larger than the area of vias thereon), and a high concentration of charges (due to small amount of vias). In the present embodiment, galvanic corrosion occurs between the metal line 206b and via 207a.

FIGS. 3A-3E are photo diagrams of interconnect structures at different conditions. In each of FIGS. 3A-3E, a first metal line M1, a second metal line M2, and a via (not numbered) between the metal lines M1 and M2 are shown. The photo diagrams in FIGS. 3A-3E are taken from different conditions in Table 1 below.

TABLE 1

Figure 3C:
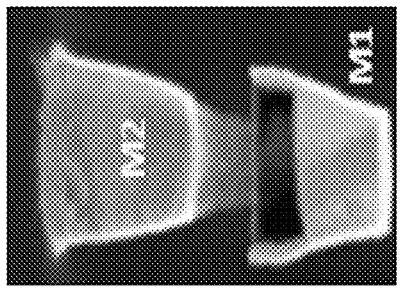
FIGS. 3A-3E are photo diagrams of interconnect structures at different conditions.
Figure 3B:
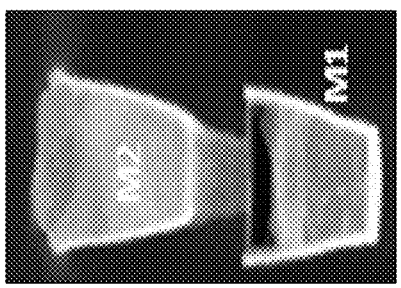
Figure 3A:
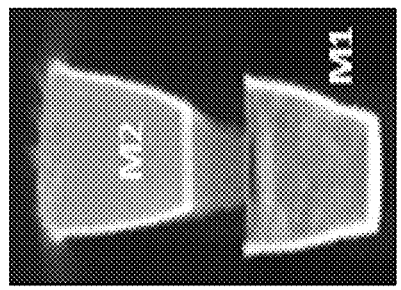
Figure 3E:
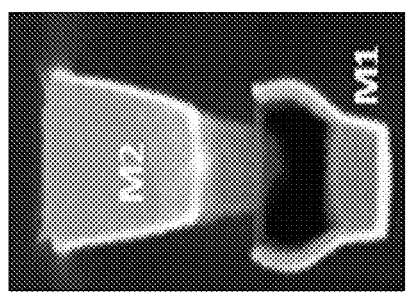
Figure 3D:
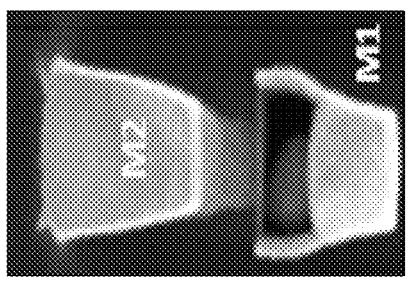

|  | FIG. 3A | FIG. 3B | FIG. 3C | FIG. 3D | FIG. 3E |
|---|---|---|---|---|---|
| Conductivity Test | Pass | Fail | Fail | Fail | Fail |
| Gate Oxide Area (μm) | 3413 | 6825 | 13650 | 15488 | 27563 |
| Area ratio of M1/via | 196272 | 261075 | 375854 | 421211 | 640745 |
| Area ratio of gate oxide/via | 348214 | 696429 | 1392857 | 1580357 | 2812500 |
| Area of diode (μm) | N.A. | N.A. | N.A. | N.A. | 0.26 * 0.11 |

From FIGS. 3A-3E, it can be found that voids due to the galvanic corrosion are present in the conditions associated with FIGS. 3B-3E. As previously discussed, the gate oxide acts as a charge tank in a galvanic corrosion effect. Therefore, the area of the gate oxide would determine the amount of charges. As to the ratio of the area of metal line M1 to the area (or number) of the via and the ratio of the area of the gate oxide to the area of the via, they determine accumulation of charges and concentration of charges. Accordingly, the greater the ratios, the more charges being accumulated or concentrated. In other words, the greater the ratios, the more accumulation of charges and the higher concentration of charges. Regarding the diode shown in Table 1, it provides a path to discharge or release charges, which will be discussed in more detail with reference to FIGS. 5A and 5B. However, although a semiconductor device associated with FIG. 3E is coupled with a diode to discharge or release charges, the serious galvanic corrosion still occurs. Accordingly, it can be observed that a diode having a relatively small area cannot provide an effective path to discharge or release charges.

Figure 4:
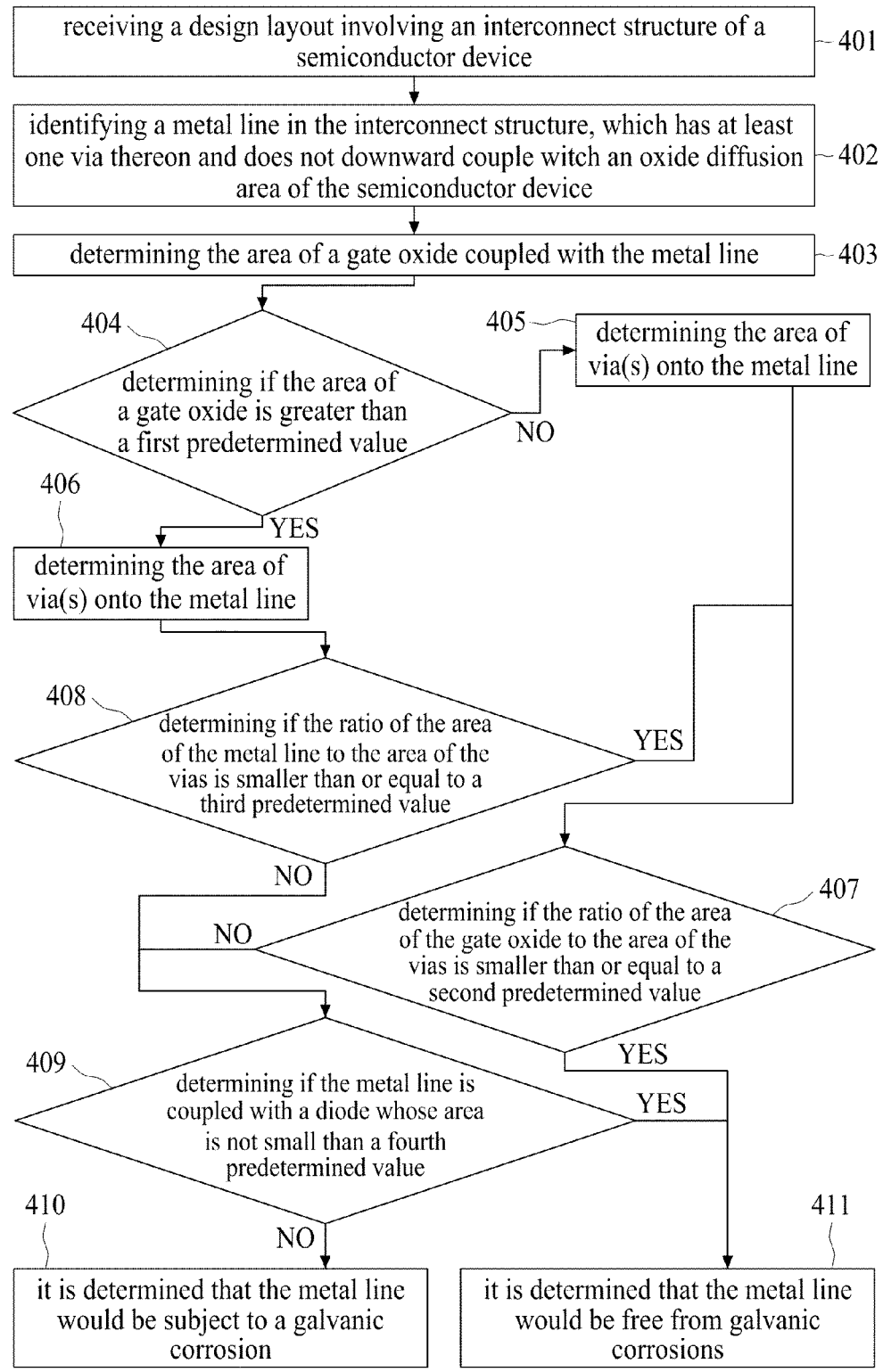
FIG. 4 is a flow diagram of a method for determining whether galvanic corrosion occurs in an interconnect structure of a semiconductor device.

FIG. 4 is a flow diagram of a method for determining whether galvanic corrosion occurs in an interconnect structure of a semiconductor device. It can be understood that the method can be performed or executed by a computer, a processor, or other similar devices. Referring to FIG. 4, in operation 401, a design layout involving an interconnect structure of a semiconductor device is received.

In operation 402, based on the received design layout, a metal line in the interconnect structure is identified. The identified metal line has least one via thereon and does not downward couple with any oxide diffusion area of the semiconductor device. As previously discussed, if no vias are formed on the metal line, no galvanic corrosion would be likely to occur because no wet cleaning (or wet etching) is performed. Additionally, if a metal line is downward coupled with an oxide diffusion area, no galvanic corrosion would be likely to occur between said metal line the via(s) thereon because the charges can be discharged or released to the oxide diffusion area. As a result, if any metal line satisfies said two conditions, it is not necessary to check subsequent conditions in the method flow because no galvanic corrosion would be likely to occur.

In operation 403, from the design layout, the area of the gate oxide coupled with the identified metal line is determined. As discussed earlier, said metal line is formed over and electrically connected to a gate oxide. Moreover, the area of the gate oxide determines the amount of charges. It can be understood that the more charges in a gate oxide, the higher likelihood that galvanic corrosion occurs.

In operation 404, it is determined whether the area of the gate oxide is greater than a first predetermined value. The first predetermined value can be calculated from Eqn. 1 below.

$$A = (C*d)/(\in_r * \in_0)$$ Eqn. 1

In Eqn. 1, "A" stands for the first predetermined value. In addition, "$\in_r$" represents the relative static permittivity, which sometimes is called as the dielectric constant of the gate oxide. "$\in_r$" varies as the material of the gate oxide varies. For a vacuum, "$\in_r$" is 1. Moreover, "$\in_0$" stands for the electric constant, which is about $8.854 \times 10^{-12}$ F/m (F stands for Farad, unit of electrical capacitance; m stands for meter). In Eqn. 1, "C" stands for the effective capacitance of the gate oxide, which is approximately $270 \times 10^{-12}$ F (i.e., 270 pF) in an embodiment. In addition, "d" in Eqn. 1 represents the thickness of the gate oxide, and the unit is meter. For example, in a 40 nanometer architecture, "A" (i.e., the first predetermined value) is approximately 19200 $\mu m^2$. If the area of the gate oxide is greater than a first predetermined value, it is likely that a galvanic corrosion may occur. If not, the likelihood is relatively low.

In operations 405 and 406, no matter whether the area of the gate oxide is greater than a first predetermined value, the area of via(s) on the metal line is determined from the design layout.

Subsequent to operations 404 and 405, if the area of the gate oxide is not greater than a first predetermined value, the ratio of the area of the gate oxide to the area of the via(s) is compared with a second predetermined value in operation 407. If said ratio is smaller than or equal to the second predetermined value, the likelihood that a galvanic corrosion may occur is low because the concentration of charges at the bottom of the via(s) is too low to trigger a galvanic corrosion. In contrast, if said ratio is greater than the second predetermined value, the likelihood that a galvanic corrosion may occur is high because the concentration of charges at the bottom of the via(s) is high enough to trigger a galvanic corrosion. In some embodiments, the second predetermined value ranges from 300000 to 350000. Accordingly, if the area of the gate oxide is not greater than the first predetermined value, and if the ratio of the area of the gate oxide to the area of the via(s) is smaller than or equals to the second predetermined value, then in operation 411 it is determined that the metal line is free from galvanic corrosion.

Subsequent to operations 404 and 406, if the area of the gate oxide is not greater than the first predetermined value, the ratio of the area of the metal line to the area of the via(s) on the metal line is compared with a third predetermined value in operation 408. If said ratio is smaller than or equal to the third predetermined value, the likelihood that a galvanic corrosion may occur is low because the charges accumulated in the metal line and concentrated at the bottom of the via(s) leads to a low concentration of charges, so a galvanic corrosion is not likely to be triggered. In contrast, if said ratio is greater than the third predetermined value, the likelihood that a galvanic corrosion may occur is high because the concentration of charges at the bottom of the via(s) may be high enough to trigger a galvanic corrosion. In some embodiments, the third predetermined value ranges from 350000 to 400000. If in operation 408 the comparison reveals that the ratio of the metal line to the area of the vias is smaller than or equal to the third predetermined value, then the comparison in operation 407 is performed.

If any of the comparison results in operations 407 and 408 is negative, it is determined whether the metal line is coupled with a diode in operation 409. In an embodiment, the area of the diode is not smaller than a fourth predetermined value. As mentioned earlier, the diode is configured to serve as a charge release path. Furthermore, to effectively release the charges, the diode has an area not smaller than the fourth predetermined value. If the metal line couples with the diode having the desired area, the galvanic corrosion may not occur. In some embodiments, the fourth predetermined value ranges from 0.25 $\mu m^2$ to 1 $\mu m^2$. If the comparison result in operation 409 is positive, it is determined that the metal line is free from galvanic corrosions in operation 411. In contrast, if the comparison result in 409 is negative, it is determined that the metal line is liable to a galvanic corrosion in operation 410.

If a metal line in the semiconductor device is determined to be subject to galvanic corrosion, the interconnect associated with the metal line is redesigned such that charges in the metal line can be discharged, distracted, or released to prevent galvanic corrosion. In the present disclosure, a charge release path is coupled to the metal line having been determined to be subject to galvanic corrosion. In addition, coupling a charge release path to the metal line comprises coupling the metal line to a diode having a predetermined area or adding additional vias on the metal line, which will be discussed in detail with reference to FIGS. 7A and 7B.

Figure 5A:
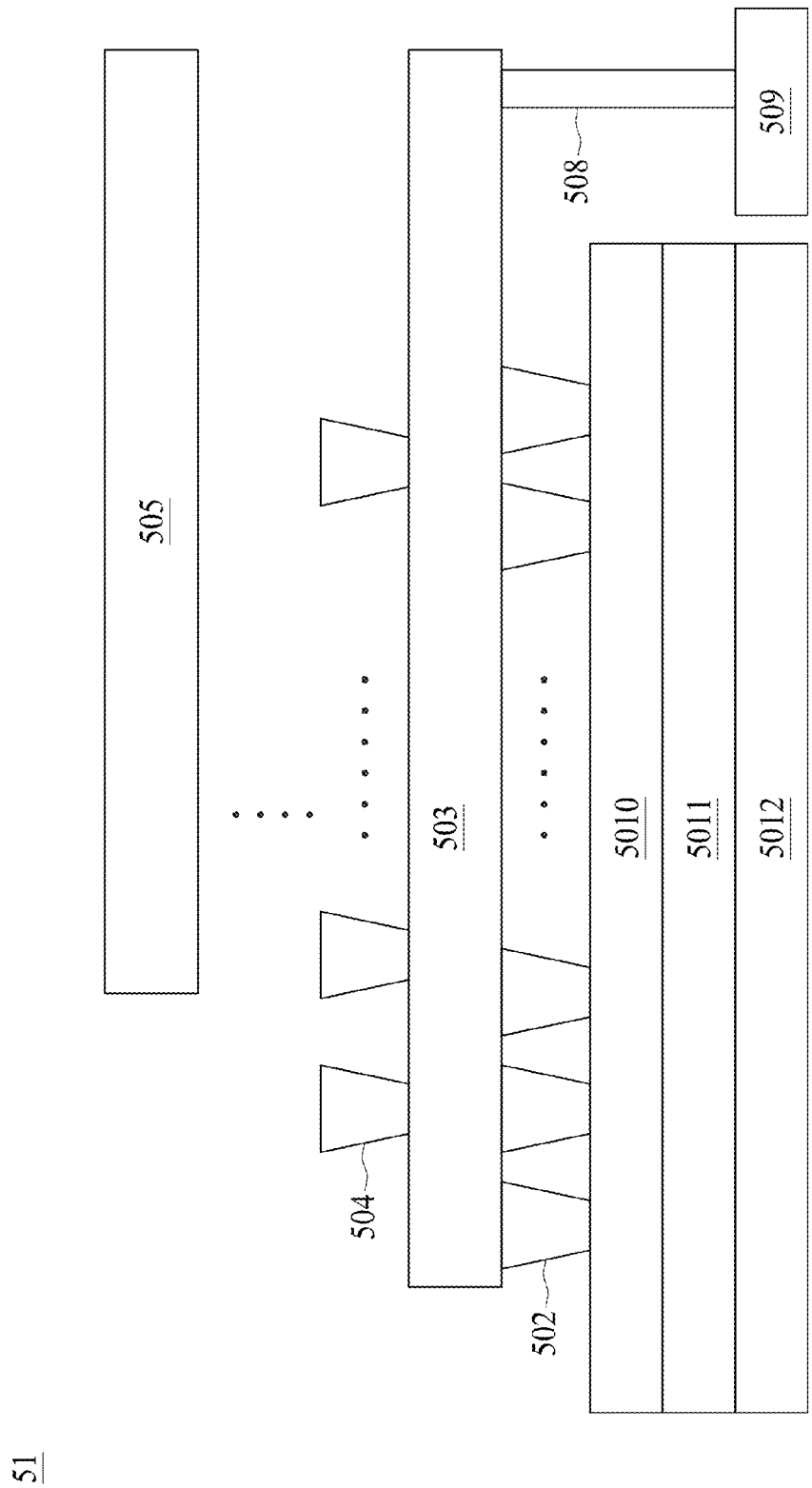
FIGS. 5A and 5B are cross-sectional views of interconnect structures in a semiconductor device, in accordance with some embodiments of the present disclosure.
Figure 5B:
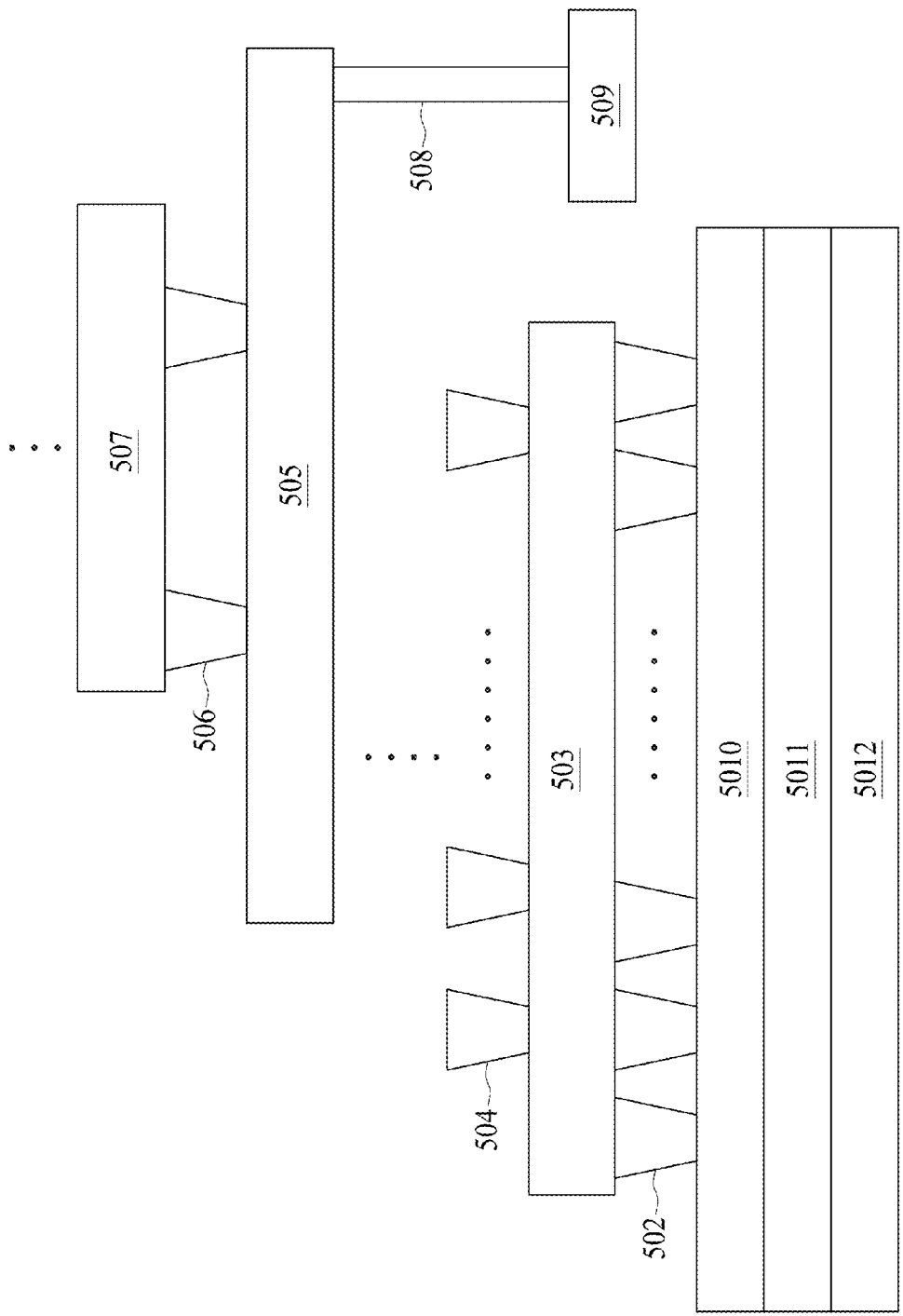

FIGS. 5A and 5B cross-sectional views of interconnect structures in a semiconductor device, in accordance with some embodiments of the present disclosure. Specifically, FIGS. 5A and 5B show the embodiments of preventing galvanic corrosion by coupling with a diode. Referring to FIG. 5A, the interconnect structure in a semiconductor 51 includes a gate 5010, a gate oxide 5011, an oxide diffusion area 5012, contacts 502, vias 504, a conductive path 508, and metal lines 503 and 505. For the purpose of simplicity and clarity, the dielectric materials between different layers of metal lines are omitted. Nevertheless, a higher level of metal line X 505 is shown, where "X" is an integer larger than 1. It is assumed that galvanic corrosion would otherwise occurs between the metal line 1 503 and via 504 if the metal line 1 503 in the semiconductor device 51 is not coupled to a diode 509 through a conductive path 508. To prevent the galvanic corrosion, the charges accumulated in metal line 1 503 should be released. Further, to release the charges, the diode 509 designed with a predetermined area is added to couple metal line 1 503 through the conductive path 508 to, for example, a reference voltage level. With the diode 509, the galvanic corrosion associated with the metal line 1 503 is prevented during the manufacturing processes because the charges that would otherwise accumulate between the metal line 1 503 and via 504 have been released.

Referring FIG. 5B, the interconnect structure in a semiconductor 52 includes a gate 5010, a gate oxide 5011, an oxide diffusion area 5012, contacts 502, vias 504, 506, a conductive path 508, and metal lines 503, 505, 507. For the purpose of simplicity and clarity, the dielectric materials between different layers of metal lines are omitted. Nevertheless, higher levels of metal line X 505 and metal line X+1 507 are shown, where "X" is an integer larger than 1. It is assumed that galvanic corrosion would otherwise occurs between the metal line X 505 and via 506 if the metal line X 505 in the semiconductor device 52 is not coupled to a diode 509 through a conductive path 508. To prevent galvanic corrosion, the charges accumulated in metal line X 505 should be released. Further, to release the charges, the diode 509 designed with a predetermined area is added to couple metal line X 505 through the conductive path 508 to, for example, a reference voltage level. With the diode 509, galvanic corrosion associated with the metal line X 505 is prevented during the manufacturing processes because the charges that would otherwise accumulate between the metal line X 505 and via 506 have been released.

Figure 6A:
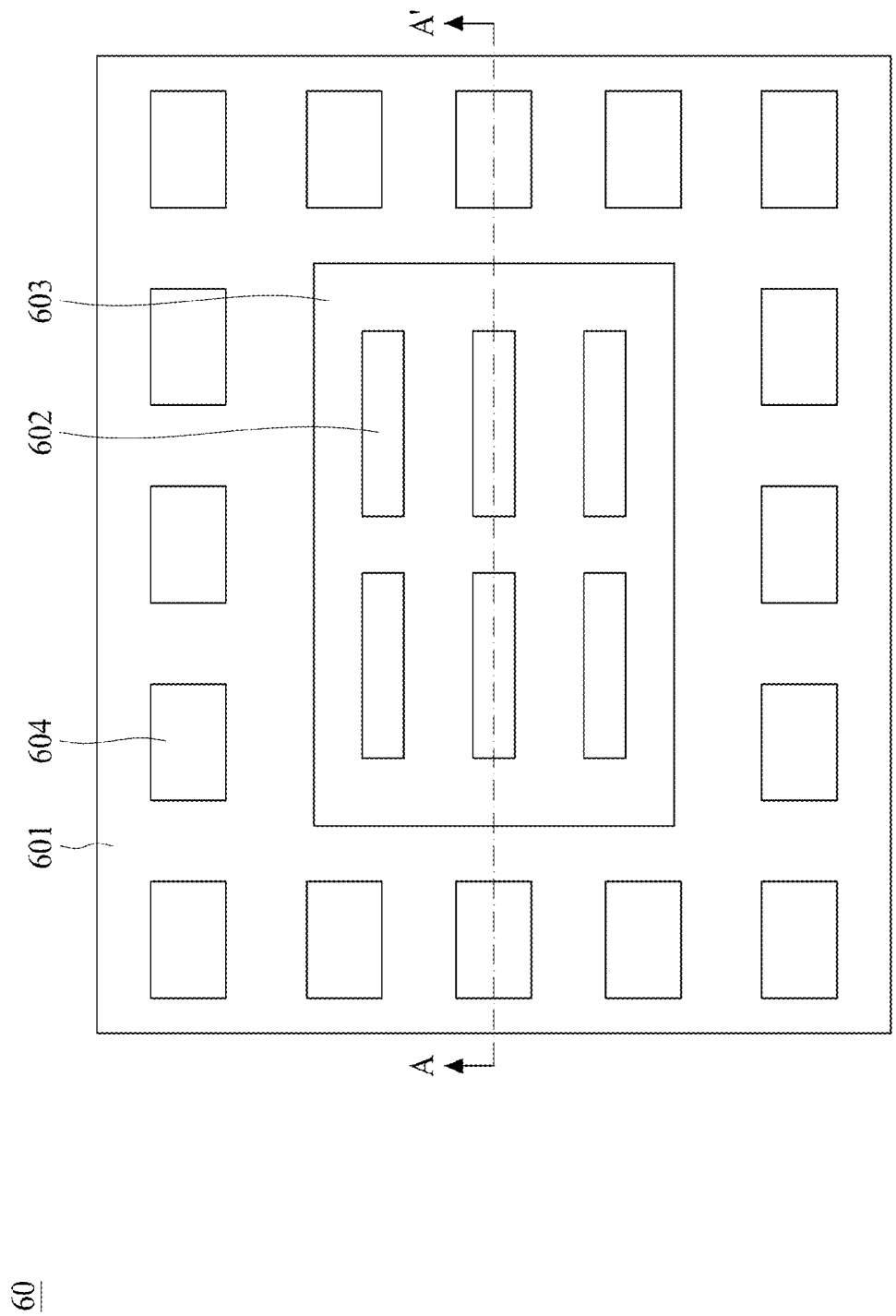
FIG. 6A is a layout diagram of a semiconductor device, in accordance with some embodiments of the present disclosure.
Figure 6B:
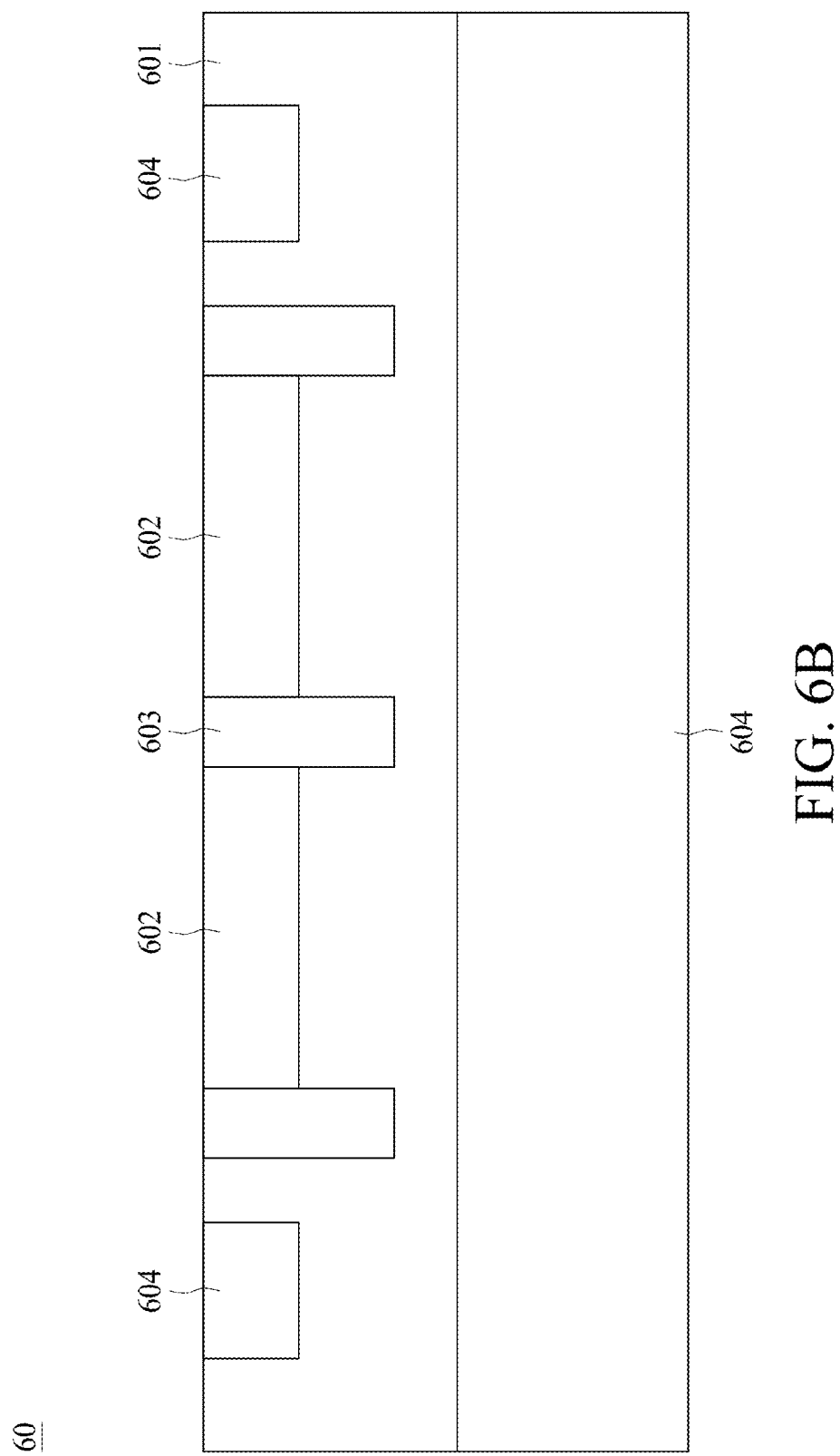
FIG. 6B is a cross-sectional view of the semiconductor device illustrated in FIG. 6A taken along a line AA', in accordance with some embodiments of the present disclosure.

FIG. 6A is a layout diagram of a semiconductor device 60, in accordance with some embodiments of the present disclosure, while FIG. 6B is a cross-sectional view of the semiconductor device 60 taken along a line AA', in accordance with some embodiments of the present disclosure. Specifically, FIGS. 6A and 6B show an example of the diode 509 in FIGS. 5A and 5B. Referring to FIG. 6A and FIG. 6B, in the present embodiments the semiconductor device 60 includes an n-type metal-oxide-semiconductor (NMOS) transistor, which in turn includes a gate oxide that acts as a large capacitor. A diode, defined by an N+ implant 602 and a P well 601, is configured to release charges. In other embodiments, in the case of a p-type metal-oxide-semiconductor (PMOS) transistor, a diode defined by a P+ implant (not shown) and an N well (not shown) can be configured to release charges. For the purpose of simplicity and clarity, FIGS. 6A and 6B only show an exemplary N+ implant/P well junction diode. Persons skilled in the art can easily achieve a P+ implant/N well junction diode based on the disclosure of FIGS. 6A and 6B.

Accordingly, in FIG. 6A the diode comprises the P well region 601, N+ implant regions 602, a shallow trench isolation (STI) region 603, and P+ implant regions 604. The P+ implant regions 604 surrounding the STI region 603 act as dummy active areas (i.e., dummy oxide diffusion areas), while N+ implant regions 602 surrounded by the STI region 603 are the active areas for releasing charges. As such, the metal line X 505 illustrated in FIGS. 5A and 5B, can be coupled with at least one of the N+ implant regions 602 surrounded by the STI region 603 for charge release. If the metal line X 505 is coupled with more than one N+ implant regions 602, the diode has a larger effective area for releasing charges. To enable the advantageous effect, the effective area in an embodiment ranges from 0.25 $\mu m^2$ to 1 $\mu m^2$.

Referring to FIG. 6B, the P well region 601 is formed in a substrate 604, and the N+ implant regions 602, STI regions 603, and P+ implant regions 604 are formed in the P well region 601.

Figure 7A:
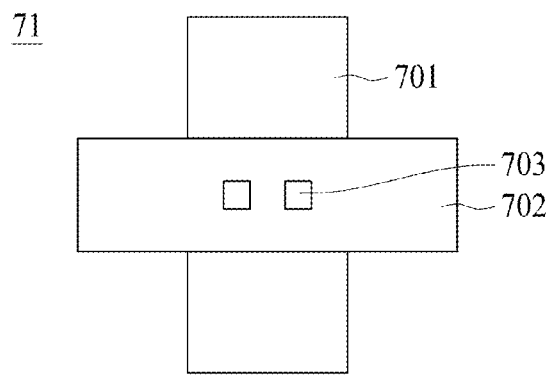
FIG. 7A is a schematic diagram of an interconnect structure in a semiconductor device without correction protection.

FIG. 7A is a schematic diagram of an interconnect structure in a semiconductor device 71 without corrosion protection. Referring to FIG. 7A, it is assumed that in the semiconductor device 71 galvanic corrosion would occur between a metal line X 701 and vias 703, wherein the vias 703 are located between the metal line X 701 and a metal line X+1 702. As mentioned earlier, fewer vias 703 formed on the metal line X 701 may result in a higher concentration of charges between the metal line X 701 and vias 703, and hence incur galvanic corrosion between the metal line 701 and vias 703. If the number of the vias 703 on the metal line X 701 increases, the concentration of charges between the metal line X 701 and vias 703 decreases.

Figure 7B:
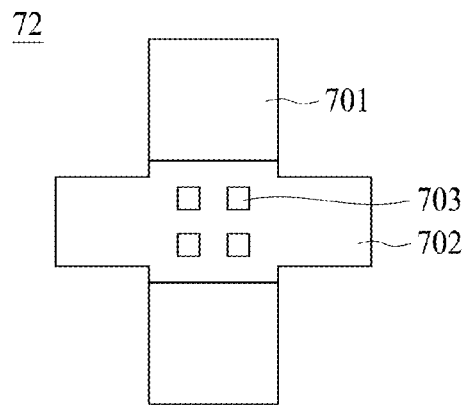
FIG. 7B is a schematic diagram of an interconnect structure in a semiconductor device, in accordance with some embodiments of the present disclosure.
Figure 7C:
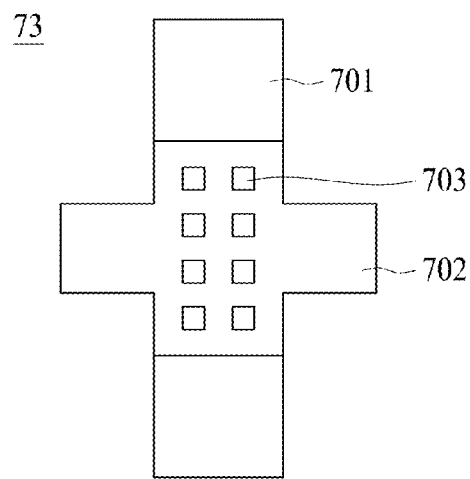
FIG. 7C is a schematic diagram of an interconnect structure in a semiconductor device, in accordance with some embodiments of the present disclosure.

FIGS. 7B and 7C show the embodiments of adding additional vias on the metal line X 701 in semiconductor devices 72 and 73, respectively, to decrease the concentration of charges between the metal line X 701 and vias 703. Referring to FIG. 7B, in the semiconductor device 72 the number of the vias 703 on the metal line X 701 is twice as that in the semiconductor device 71 shown in FIG. 7A. Effectively, the concentration of charges between the metal line X 701 and vias 703 in the semiconductor device 72 is half of that in the semiconductor device 71 in FIG. 7A. Since the additional vias are added, the shape of the metal line X+1 702 may be slightly modified to accommodate the extra vias. For example, the shape of the metal line X+1 702 is changed to a dog-bone shape to accommodate all vias 703. With the additional vias, the ratio of the area of the metal line X 701 to the area of the vias 703 is smaller than or equal to the third predetermined value to prevent the galvanic corrosion, wherein the third predetermined value in an embodiment ranges from 350000 to 400000. If the ratio of the area of the metal line X 701 to the area of the vias 703 is still greater than the third predetermined value in FIG. 7B, the number of vias can be further added as shown in the semiconductor device 73 illustrated in FIG. 7C. Since more additional vias 703 are added, the dog-bone shape of the metal line X+1 702 in the semiconductor 73 in FIG. 7C is further changed to accommodate all the vias 703.

In some embodiments, in a method for a semiconductor device having an interconnect structure, a design layout is received. A metal line in the design layout, which has at least one via thereon and does not couple downward with an oxide diffusion region, is identified. The area of a gate oxide coupled with the metal line is obtained from the design layout. The method comprises determining whether the area of the gate oxide is greater than a first predetermined value. When the area of the gate oxide is greater than the first predetermined value, a charge release path is coupled with the metal line.

In some embodiments, a semiconductor device has an interconnect structure. The interconnect structure of the semiconductor device comprises a gate oxide; a metal line coupled with and formed over the gate oxide; and a discharging path coupled with the metal line, wherein the metal line has at least one via formed thereon and does not couple with an oxide diffusion region downward.

In some embodiments, a semiconductor device has an interconnect structure. The interconnect structure of the semiconductor device comprises a gate oxide and a metal line coupled with and formed over the gate oxide, wherein the metal line has a plurality of vias formed thereon and does not couple with an oxide diffusion region downward. In the semiconductor, the plurality of vias comprises redundant vias, and a corrosion between the metal line and the plurality of vias is prevented by the redundant vias.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device having an interconnect structure, the interconnect structure comprising:
    a gate oxide;
    a metal line coupled with and formed over the gate oxide;
    at least one via formed on the metal line; and
    a discharging path coupled with the metal line, wherein a galvanic corrosion between the metal line and the at least one via is prevented by the discharging path.

2. According to the semiconductor device of claim 1, wherein the discharging path comprises a diode having an area ranging from 0.25 $\mu m^2$ to 1 $\mu m^2$.

3. According to the semiconductor device of claim 1, wherein
    the discharging path comprises a diode; and
    the gate oxide comprises an NMOS gate oxide, and the diode is formed by an N heavy implant and a P well junction, or the gate oxide comprises a PMOS gate oxide, and the diode is formed by a P heavy implant and an N well junction.

4. According to the semiconductor device of claim 1, wherein the area of the gate oxide is greater than a first predetermined value determined by a thickness of the gate oxide.

5. According to the semiconductor device of claim 1, wherein a ratio of an area of the metal line to the area of the at least one via is greater than 350000.

6. According to the semiconductor device of claim 1, wherein the ratio of the area of the gate oxide to the area of the at least one via is greater than 300000.

7. A semiconductor device having an interconnect structure, the interconnect structure comprising:
   a gate oxide;
   a metal line coupled with and formed over the gate oxide; and
   a plurality of vias formed on the metal line, wherein the plurality of vias comprises at least one first via and redundant vias, and a galvanic corrosion between the metal line and the at least one first via is prevented by the redundant vias.

8. According to the semiconductor device of claim 7, wherein the area of the gate oxide is greater than a first predetermined value determined by a thickness of the gate oxide.

9. According to the semiconductor device of claim 7, wherein a ratio of an area of the metal line to the area of the plurality of vias is smaller than or equal to 400000.

10. According to the semiconductor device of claim 7, wherein an upper metal line is coupled with the metal line by the plurality of vias, and wherein the shape of the upper metal line is configured to cover the plurality of vias.

11. According to the semiconductor device of claim 7, wherein the ratio of the area of the gate oxide to the area of the at least one first via is greater than 300000.

12. A semiconductor device having an interconnect structure, the interconnect structure comprising:
   a gate oxide;
   a metal line coupled with and formed over the gate oxide;
   at least one via formed on the metal line; and
      an effective capacitance of the gate oxide being smaller than a first predetermined value over which an area of the metal line is considered for preventing galvanic corrosion between the metal line and the at least one via; and
   a galvanic corrosion prevention mechanism comprising at least one conductive path formed to control a charge concentration between the metal line and the at least one via so as to prevent galvanic corrosion between the metal line and the at least one via.

13. According to the semiconductor device of claim 12, wherein the first predetermined value is approximately 270 pF.

14. According to the semiconductor device of claim 12, wherein when the area of the metal line is considered for preventing galvanic corrosion between the metal line and the at least one via, whether a ratio of the area of the metal line to an area of the at least one via is smaller than or equal to 400000 is considered.

15. According to the semiconductor device of claim 12, wherein the at least one conductive path comprises a diode.

16. According to the semiconductor device of claim 12, wherein a ratio of an area of the gate oxide to an area of the at least one via is greater than 300000.

17. According to the semiconductor device of claim 12, wherein
   the at least one conductive path comprises a diode; and
   the gate oxide comprises an NMOS gate oxide and the diode is formed by an N heavy implant and a P well junction, or the gate oxide comprises a PMOS gate oxide and the diode is formed by a P heavy implant and an N well junction.

18. According to the semiconductor device of claim 12, wherein the at least one conductive path comprises at least one redundant via formed on the metal line.

19. According to the semiconductor device of claim 18, wherein a ratio of an area of the gate oxide to a total area of the at least one via and the at least one redundant via is smaller than or equal to 350000.

20. According to the semiconductor device of claim 18, wherein an upper metal line is coupled with the metal line by the at least one via and the at least one redundant via, and wherein the shape of the upper metal line is wider at where the upper metal line is overlapped with the metal line than at where the upper metal line is not overlapped with the metal line to cover the at least one via and the at least one redundant via.

* * * * *